(12) United States Patent
Akachi

(10) Patent No.: US 11,158,190 B2
(45) Date of Patent: Oct. 26, 2021

(54) RECOMMENDED DRIVING OUTPUT DEVICE, RECOMMENDED DRIVING OUTPUT METHOD AND RECOMMENDED DRIVING OUTPUT SYSTEM

(71) Applicant: CLARION CO., LTD., Saitama (JP)

(72) Inventor: Masashi Akachi, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/607,423

(22) PCT Filed: Mar. 22, 2018

(86) PCT No.: PCT/JP2018/011475
§ 371 (c)(1),
(2) Date: Oct. 23, 2019

(87) PCT Pub. No.: WO2018/198614
PCT Pub. Date: Nov. 1, 2018

(65) Prior Publication Data
US 2020/0135021 A1     Apr. 30, 2020

(30) Foreign Application Priority Data

Apr. 27, 2017   (JP) .............................. JP2017-087952

(51) Int. Cl.
*G08G 1/0962*     (2006.01)
*B60N 2/90*       (2018.01)
(Continued)

(52) U.S. Cl.
CPC ........... *G08G 1/09626* (2013.01); *B60N 2/90* (2018.02); *B60Q 9/00* (2013.01); *G08G 1/0133* (2013.01);
(Continued)

(58) Field of Classification Search
CPC .......... B60N 2/90; G08G 1/096; G08G 1/166; G08G 1/205; G08G 1/167; G08G 1/0962; G08G 1/163; B60Q 9/008
See application file for complete search history.

(56) References Cited

U.S. PATENT DOCUMENTS 5,954,781 A * 9/1999 Slepian .................. B60K 28/00
701/96
7,183,942 B2 * 2/2007 Rock .................. G01C 21/3697
340/901
(Continued)

FOREIGN PATENT DOCUMENTS

JP   2009-059200 A   3/2009
JP   2011-075397 A   4/2011
(Continued)

OTHER PUBLICATIONS

International Search Report for Pc/JP2018/011475, dated Jun. 26, 2018.

*Primary Examiner* — Hoi C Lau
(74) *Attorney, Agent, or Firm* — Volpe Koenig

(57) ABSTRACT

A recommended driving output device, system, and method allow for outputting preferable information to a driver. A recommended driving output device includes: a surrounding situation acquisition unit configured to acquire a surrounding situation of a vehicle; a recommended driving information storage unit configured to store the surrounding situation of the vehicle, a warning, and a recommended driving instruction in association with each other; a warning receiving unit configured to receive a warning depending on the surrounding situation of the vehicle; a recommended driving instruction selecting unit configured to select the recommended driving instruction from the recommended driving information storage unit, by using the warning received by the warning receiving unit and the surrounding situation of (Continued)

the vehicle acquired by the surrounding situation acquisition unit; and an output processing unit configured to output the recommended driving instruction selected by the recommended driving instruction selecting unit.

7 Claims, 13 Drawing Sheets

(51) Int. Cl.
  *B60Q 9/00* (2006.01)
  *G08G 1/01* (2006.01)
  *G08G 1/16* (2006.01)
(52) U.S. Cl.
  CPC .......... *B60N 2002/981* (2018.02); *G08G 1/16* (2013.01)

(56) References Cited

U.S. PATENT DOCUMENTS

| | | | |
|---|---|---|---|
| 8,886,392 B1* | 11/2014 | Maeng | G06Q 10/20 701/29.4 |
| 8,996,234 B1* | 3/2015 | Tamari | G07C 5/085 701/29.3 |
| 9,487,139 B1* | 11/2016 | Ishida | B60W 30/08 |
| 9,542,847 B2* | 1/2017 | Sherony | G08G 1/167 |
| 9,581,460 B1* | 2/2017 | McNew | G01C 21/3667 |
| 9,679,487 B1* | 6/2017 | Hayward | G01C 21/3492 |
| 9,944,282 B1* | 4/2018 | Fields | A61B 5/4064 |
| 10,223,752 B1* | 3/2019 | Binion | G06Q 40/08 |
| 10,414,407 B1* | 9/2019 | Slusar | B60W 40/09 |
| 2004/0239490 A1* | 12/2004 | Chiba | B62D 15/029 340/435 |
| 2004/0239509 A1* | 12/2004 | Kisacanin | A61B 5/18 340/575 |
| 2005/0128063 A1* | 6/2005 | Isaji | B60W 10/18 340/439 |
| 2006/0165259 A1* | 7/2006 | Ogawa | G08G 1/163 382/104 |
| 2007/0109104 A1* | 5/2007 | Altan | B60Q 9/008 340/407.1 |
| 2007/0188348 A1* | 8/2007 | Bauer | G08G 1/162 340/905 |
| 2008/0266072 A1* | 10/2008 | Suzuki | G08G 1/0962 340/438 |
| 2009/0224942 A1* | 9/2009 | Goudy | G08G 1/096783 340/905 |
| 2010/0188200 A1* | 7/2010 | Hashimoto | B62D 15/029 340/435 |
| 2012/0025969 A1* | 2/2012 | Dozza | B60Q 5/006 340/463 |
| 2012/0038489 A1* | 2/2012 | Goldshmidt | G08G 1/166 340/903 |
| 2012/0293314 A1* | 11/2012 | Chatterjee | G08G 1/166 340/436 |
| 2013/0090843 A1* | 4/2013 | Funabashi | G08G 1/0969 701/300 |
| 2013/0187771 A1* | 7/2013 | Rothschild | G08G 1/096716 340/435 |
| 2015/0015712 A1* | 1/2015 | Sempuku | G08G 1/166 348/148 |
| 2015/0035666 A1* | 2/2015 | Scofield | B60W 40/09 340/439 |
| 2015/0158469 A1* | 6/2015 | Cheatham, III | B60T 7/12 701/96 |
| 2015/0160653 A1* | 6/2015 | Cheatham, III | B60W 30/0956 701/23 |
| 2016/0005315 A1* | 1/2016 | Cudak | H04L 12/1845 340/435 |
| 2016/0110618 A1* | 4/2016 | Oba | G06K 9/6215 348/148 |
| 2016/0119799 A1* | 4/2016 | Hutchins | B61L 27/0027 455/67.7 |
| 2016/0159366 A1* | 6/2016 | Tsuyunashi | B60W 40/09 340/439 |
| 2016/0185347 A1* | 6/2016 | Lefevre | B60W 30/18154 701/301 |
| 2016/0185348 A1* | 6/2016 | Miura | B60W 30/0953 701/41 |
| 2016/0343254 A1* | 11/2016 | Rovik | G01J 1/0488 |
| 2017/0021835 A1* | 1/2017 | Kojima | G07C 5/08 |
| 2017/0076605 A1* | 3/2017 | Suzuki | G08G 1/133 |
| 2017/0084174 A1* | 3/2017 | Suzuki | B60W 30/00 |
| 2017/0101054 A1* | 4/2017 | Dusane | G08G 1/205 |
| 2017/0101056 A1* | 4/2017 | Park | B60R 1/00 |
| 2017/0162049 A1* | 6/2017 | Lee | G08G 1/0129 |
| 2017/0162050 A1* | 6/2017 | Chen | B60W 30/095 |
| 2017/0186313 A1* | 6/2017 | Stein | G08G 1/096716 |
| 2017/0247041 A1* | 8/2017 | Kim | B60W 50/14 |
| 2017/0284823 A1* | 10/2017 | McNew | G05D 1/0274 |
| 2017/0316695 A1* | 11/2017 | Sugimoto | B60Q 9/008 |
| 2017/0325732 A1* | 11/2017 | Kodama | B60Q 1/525 |
| 2018/0099679 A1* | 4/2018 | Huang | B60W 50/16 |
| 2018/0174457 A1* | 6/2018 | Taylor | G06K 9/00302 |
| 2018/0189856 A1* | 7/2018 | Lenhart | G06F 16/9535 |
| 2018/0204459 A1* | 7/2018 | Bradley | G08G 1/164 |
| 2018/0217229 A1* | 8/2018 | Shukla | G01S 17/87 |
| 2018/0261097 A1* | 9/2018 | Jiang | G08G 1/096791 |
| 2018/0293892 A1* | 10/2018 | Lai | G01S 5/0284 |
| 2018/0326905 A1* | 11/2018 | Nakata | G08G 1/166 |
| 2019/0189008 A1* | 6/2019 | Langona | G08G 1/0112 |
| 2019/0228652 A1* | 7/2019 | Kannappa | G08G 1/0965 |
| 2019/0315375 A1* | 10/2019 | Li | G01C 21/3652 |
| 2020/0135021 A1* | 4/2020 | Akachi | B60N 2/90 |
| 2020/0164797 A1* | 5/2020 | Akachi | B60Q 9/008 |

FOREIGN PATENT DOCUMENTS

| | | |
|---|---|---|
| JP | 2012-111274 A | 6/2012 |
| JP | 2014-089579 A | 5/2014 |

\* cited by examiner (a)

SITUATION INFORMATION 1511

| TYPE | SUBJECT VEHICLE POSITION | | | SITUATION OF NEARBY VEHICLE | | | | | | | PRIMARY WARNING | | | LINE OF SIGHT | | | | PEDESTRIAN | | | REDUCTION IN NUMBER OF LANES |
|---|---|---|---|---|---|---|---|---|---|---|---|---|---|---|---|---|---|---|---|---|---|
| | LEFT | MIDDLE | RIGHT | LEFT_FRONT | MIDDLE_1 FRONT | MIDDLE_2 FRONT | RIGHT_FRONT | LEFT_BEHIND | MIDDLE_BEHIND | RIGHT_BEHIND | FRONT COLLISION | REAR COLLISION | REDUCTION IN NUMBER OF LANES | LEFT | RIGHT | DOWN | | LEFT | MIDDLE | DOWN | |
| 01 | 1 | | | 1 | | | | | | | 1 | | | | | | | | | | |
| | | 1 | | | 1 | | | | | 1 | 1 | | | | | | | | | | |
| | | 1 | | | 1 | | | | | | 1 | | | | | | | | | | |
| | | | 1 | | | | 1 | | | | 1 | | | | 1 | | | | | | |
| 02 | 1 | | | 1 | | | | | | | 1 | | | | 1 | | | | | | |
| | | 1 | | | 1 | | | 1 | 1 | | | | | | | | | | | | |
| | | | 1 | | | | | | | 1 | | | | | | | | | | | |
| ... | ... | ... | ... | ... | ... | ... | ... | ... | ... | ... | ... | ... | ... | ... | ... | ... | | ... | ... | ... | ... |

TENDENCY INFORMATION 1512

1512a     1512b

| TYPE | DRIVING CHARACTERISTICS | | | | | |
|---|---|---|---|---|---|---|
| | WAY TO AVOID VEHICLE WHEN DISTANCE FROM VEHICLE IN FRONT IS REDUCED | | | | ... | |
| | MOVE TO LEFT LANE TO AVOID VEHICLE | MOVE TO MIDDLE LANE TO AVOID VEHICLE | MOVE TO RIGHT LANE TO AVOID VEHICLE | SLOW DOWN | ... | |
| 01 | | 1 | | | | |
| | | | 1 | | | |
| | 1 | | | | | |
| | 1 | | | | | |
| 02 | | | | 1 | | |
| | | | | 1 | | |
| | | | | 1 | | |
| ⋮ | ⋮ | ⋮ | ⋮ | ⋮ | ⋮ | ⋮ |

FIG. 5

OUTPUT CONTENT INFORMATION 1513

| TYPE | PREDICTED SECONDARY WARNING | | | WARNING | | |
|---|---|---|---|---|---|---|
| | FRONT COLLISION | REAR COLLISION | REDUCTION IN NUMBER OF LANES | NOTIFICATION | CONTENT | RECOMMENDED ACTION |
| 01 | | 1 | | 004 | THERE IS VEHICLE BEHIND | SLOW DOWN |
| | | 1 | | 004 | | |
| | | 1 | | 005 | | |
| | | 1 | | 005 | | |
| 02 | | 1 | | 010 | THERE ARE VEHICLES IN FRONT AND BEHIND | MOVE TO RIGHT LANE |
| | | 1 | | 010 | | MOVE TO ANOTHER LANE |
| | | 1 | | 010 | | MOVE TO LEFT LANE |
| ⋮ | ⋮ | ⋮ | ⋮ | ⋮ | ⋮ | ⋮ |

DRIVING CHARACTERISTICS INFORMATION 1514

1514a  1514b

| TYPE | DRIVING CHARACTERISTICS | | | | ... |
| | WAY TO AVOID VEHICLE WHEN DISTANCE FROM VEHICLE IN FRONT IS REDUCED | | | | ... |
| | MOVE TO LEFT LANE TO AVOID VEHICLE | MOVE TO MIDDLE LANE TO AVOID VEHICLE | MOVE TO RIGHT LANE TO AVOID VEHICLE | SLOW DOWN | |
| 01 | | 1 | | | |
| | | | | 1 | |
| | | | | 1 | |
| | | | | 1 | |
| 02 | | 1 | | | |
| | | | | 1 | |
| | | | | 1 | |
| ⋮ | ⋮ | ⋮ | ⋮ | ⋮ | ⋮ |

FIG. 7

OPERATION HISTORY INFORMATION 152

| | ROAD SITUATION (SUBJECT VEHICLE POSITION)/ OPERATION HISTORY | DISTANCE FROM VEHICLE IN FRONT | DISTANCE REQUIRED TO CHANGE LANES | OPERATION WHEN DISTANCE FROM VEHICLE IN FRONT WAS REDUCED | OPERATION WHEN DISTANCE FROM VEHICLE BEHIND WAS REDUCED | AVERAGE VEHICLE SPEED |
|---|---|---|---|---|---|---|
| 1 | INTERSECTION | 5m | 5m | AVOID VEHICLE IN FRONT | | 20km/h |
| 2 | SINGLE LANE ON ONE SIDE | 20m | – | AVOID VEHICLE IN FRONT | MOVE TO ROAD SHOULDER TO AVOID VEHICLE | 45km/h |
| 3 | TWO LANES ON ONE SIDE, TRAVELING IN LEFT LANE | 50m | 20m | MOVE TO RIGHT LANE TO AVOID VEHICLE | MOVE TO RIGHT LANE TO AVOID VEHICLE | 50km/h |
| 4 | TWO LANES ON ONE SIDE, TRAVELING IN RIGHT LANE | 40m | 10m | MOVE TO LEFT LANE TO AVOID VEHICLE | MOVE TO LEFT LANE TO AVOID VEHICLE | 60km/h |
| 5 | NARROW ROAD SUCH AS IN RESIDENTIAL AREA | 10m | – | BRAKE | ACCELERATOR | 30km/h |
| 6 | FREEWAY, TRAVELING IN LEFT LANE | 40m | 50m | MOVE TO RIGHT LANE TO AVOID VEHICLE | MOVE TO RIGHT LANE TO AVOID VEHICLE | 100km/h |
| 7 | FREEWAY, TRAVELING IN MIDDLE LANE | 50m | 50m | MOVE TO RIGHT LANE TO AVOID VEHICLE | MOVE TO RIGHT LANE TO AVOID VEHICLE | 100km/h |
| 8 | FREEWAY, TRAVELING IN RIGHT LANE | 50m | 50m | MOVE TO LEFT LANE TO AVOID VEHICLE | MOVE TO LEFT LANE TO AVOID VEHICLE | 110km/h |

(a)

(b)

RECOMMENDED DRIVING OUTPUT DEVICE, RECOMMENDED DRIVING OUTPUT METHOD AND RECOMMENDED DRIVING OUTPUT SYSTEM

TECHNICAL FIELD

The present invention relates to a recommended driving output device, a recommended driving output method, and a recommended driving output system. The present invention claims priority to Japanese Patent Application No. 2017-87952, filed on Apr. 27, 2017, the contents of which are incorporated by reference herein in its entirety in designated states where the incorporation of documents by reference is approved.

BACKGROUND ART

There is a technique that allows output of a warning to a driver when a predetermined event occurs during driving.

PTL 1 discloses a technique related to a driving assistant system. In paragraph [0009] of PTL 1, there is a description "when a subject vehicle determines that the subject vehicle and a nearby vehicle are located within a predetermined distance and travel at a relative speed of a predetermined value or more, and also when the subject vehicle and the nearby vehicle are located within the predetermined distance and travel at a relative speed of the predetermined value or more, the nearby vehicle implements a warning display for the subject vehicle." Further, in paragraph [0056], there is a description "when it is determined that there has been no change in the driving operation situation, and also when there is still no change in the driving operation situation even after a warning display request is made a predetermined number of times, a warning is issued to a driver of the subject vehicle by using the display device 60 and the warning sound generating device 62."

CITATION LIST

Patent Literature

PTL 1: JP 2009-59200 A

SUMMARY OF INVENTION

Technical Problem

PTL 1 discloses a technique of issuing a warning with regard to a relationship between a subject vehicle and a nearby vehicle. However, depending on a situation of a nearby vehicle, another warning may be output immediately after driving operation is performed in response to the output warning. As a result, a plurality of warnings may be output consecutively. A plurality of warnings output in such a consecutive manner may result in confusing a driver. Thus, the technique disclosed in PTL 1 does not output a warning in consideration of influence on a driver.

The present invention is achieved in view of the above, and has an object to provide a recommended driving output device, a recommended driving output method, and a recommended driving output system that allow output of information preferable for a driver.

Solution to Problem

The present application includes a plurality of solutions to the above-mentioned problem. One example of the solutions is as follows.

To solve the problem described above, a recommended driving output device according to the present invention includes: a surrounding situation acquisition unit configured to acquire a surrounding situation of a vehicle; a recommended driving information storage unit configured to store the surrounding situation of the vehicle, a warning, and a recommended driving instruction in association with each other; a warning receiving unit configured to receive a warning depending on the surrounding situation of the vehicle; a recommended driving instruction selecting unit configured to select the recommended driving instruction from the recommended driving information storage unit, by using the warning received by the warning receiving unit and the surrounding situation of the vehicle acquired by the surrounding situation acquisition unit; and an output processing unit configured to output the recommended driving instruction selected by the recommended driving instruction selecting unit.

Advantageous Effects of Invention

According to the present invention, a recommended driving output device, a recommended driving output method, and a recommended driving output system that allow output of information preferable for a driver can be provided.

A problem, configuration, and effect other than those described in the above will be apparent from the description of an embodiment given below.

BRIEF DESCRIPTION OF DRAWINGS

FIG. 3 is a diagram illustrating an example of a data structure of situation information.

FIG. 4 is a diagram illustrating an example of a data structure of tendency information.

FIG. 5 is a diagram illustrating an example of a data structure of output content information.

FIG. 6 is a diagram illustrating an example of a data structure of driving characteristics information.

FIG. 7 is a diagram illustrating an example of a data structure of operation history information.

DESCRIPTION OF EMBODIMENTS

Figure 1A:
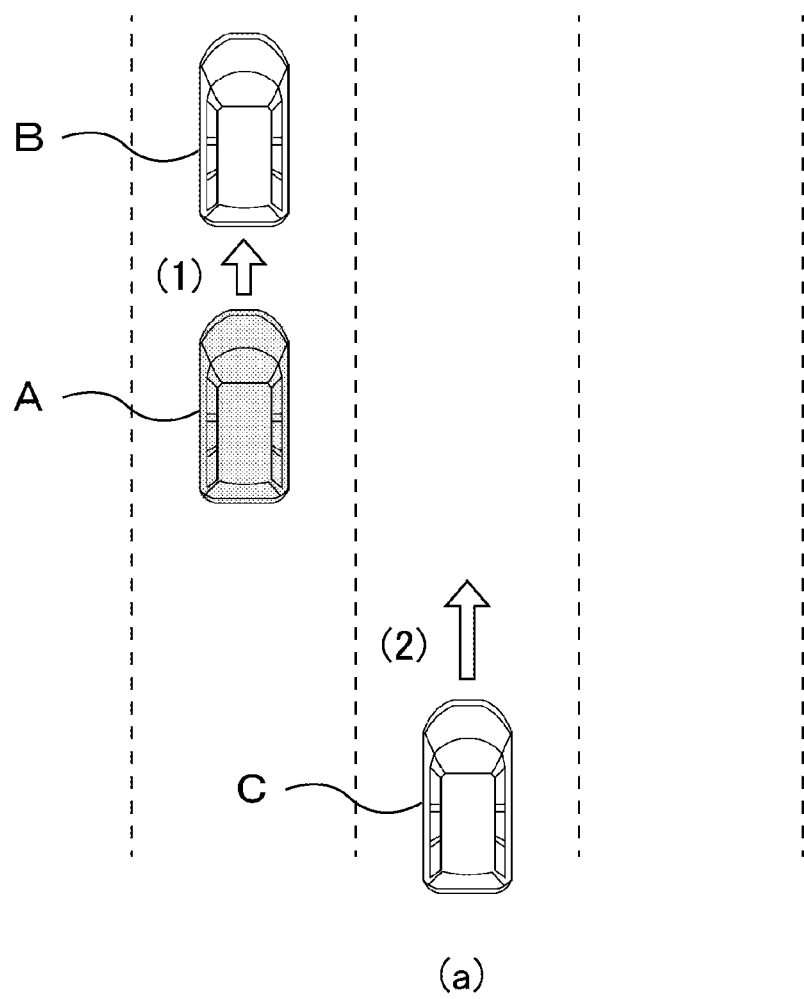
FIGS. 1A and 1B are diagrams for illustrating an overview of processing of a recommended driving output system.
Figure 1B:
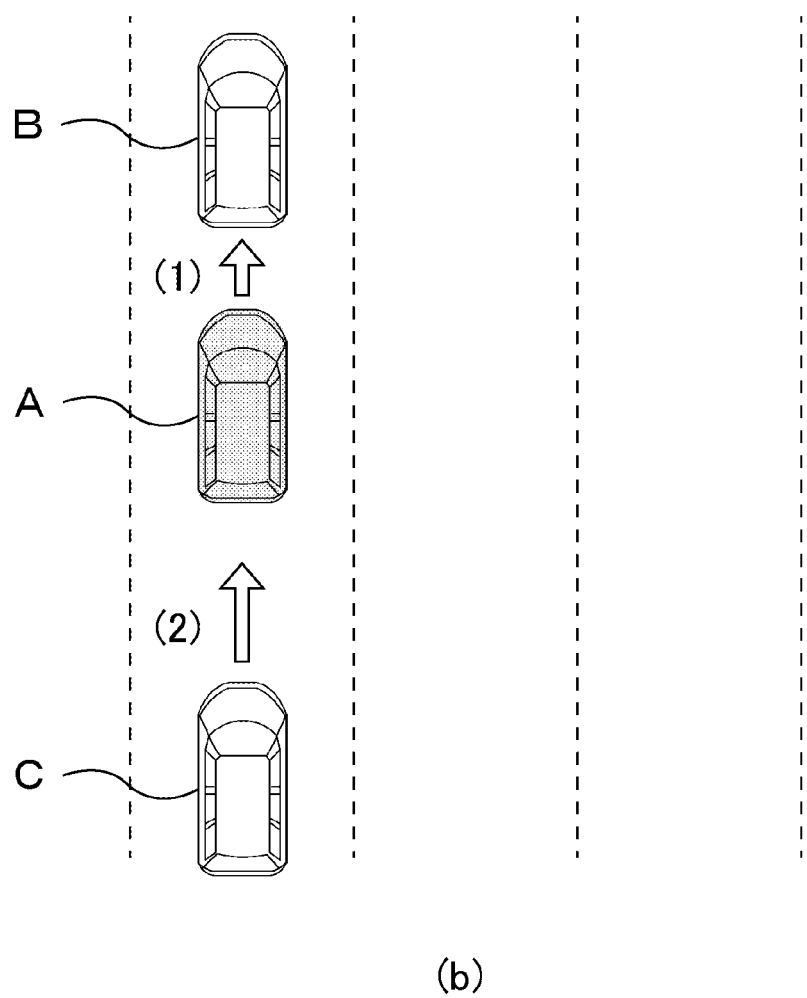

An example of an embodiment of the present invention will be described below with reference to the drawings. FIGS. 1A and 1B are diagrams for illustrating an overview of processing of a recommended driving output system. A recommended driving output system 1 according to the present embodiment is installed in a vehicle. An overview of processing of the recommended driving output system 1 installed in a vehicle A will be described below.

The recommended driving output system 1 includes a driving assistant device and a recommended driving output device, which are not illustrated in FIGS. 1A and 1B. The driving assistant device detects a surrounding situation of a vehicle (hereinafter referred to as a "vehicle surrounding situation"). When the vehicle surrounding situation is a predetermined situation, the driving assistant device issues a warning to the recommended driving output device.

In FIG. 1A, the vehicle A travels in the left lane. A vehicle B travels in front of the vehicle A. A vehicle C travels in a lane next to the lane of the vehicle A, and travels behind the vehicle A by a predetermined distance. First, the vehicle A approaches the vehicle B that is present in front of the vehicle A in the left lane (case (1) in FIG. 1A). The driving assistant device issues a warning to the recommended driving output device, in response to the approach of the vehicle A toward the vehicle B. When the vehicle A moves, in response to the warning, to a next lane to avoid a collision with the vehicle B, the vehicle C approaches the vehicle A from behind the vehicle A (case (2) in FIG. 1A).

A conventional recommended driving output device outputs a warning to a driver, at the time point when the vehicle A approaches the vehicle B. When the driver moves the vehicle A to the middle lane in response to the warning, a second warning is output, based on the approach of the vehicle C. When the driver receives two warnings consecutively, the driver may be confused.

In view of this, the recommended driving output system 1 according to the present embodiment outputs a recommended driving instruction depending on the vehicle surrounding situation of case (1) and the vehicle surrounding situation of case (2). More specifically, in the recommended driving output device, recommended driving instructions are stored in advance. Each of the recommended driving instructions indicates a driving method recommended for the driver of the vehicle A, depending on a vehicle surrounding situation. When a warning is issued from the driving assistant device to the recommended driving output device, the recommended driving output device identifies a vehicle surrounding situation of the vehicle A. When the identified vehicle surrounding situation includes the vehicle surrounding situation of case (1) and the vehicle surrounding situation of case (2), the recommended driving output device outputs a recommended driving instruction depending on the vehicle surrounding situation.

In FIG. 1B, the vehicle A traveling in the left lane approaches the vehicle B present in front of the vehicle A in the left lane (case (1) in FIG. 1B). Next, the vehicle C approaches the vehicle A from behind the vehicle A in the left lane (case (2) in FIG. 1B). In a conventional recommended driving output system, similarly to the case of FIG. 1A, a warning is output at the time point when the vehicle A approaches the vehicle B. Then, when the vehicle C approaches the vehicle A, a second warning is output. Such warnings consecutively issued a plurality of times may cause the driver's confusion.

In the recommended driving output system 1 according to the Present embodiment, when a warning is issued from the driving assistant device due to detection of the vehicle surrounding situation of case (1), the recommended driving output device determines whether or not a vehicle surrounding situation including the vehicle surrounding situation of case (1) is present. When the vehicle surrounding situation of case (2) corresponding to the vehicle surrounding situation of case (1) is present, the recommended driving output device outputs a recommended driving instruction depending on the vehicle surrounding situation of case (1) and the vehicle surrounding situation of case (2).

According to the present embodiment, when a predetermined vehicle surrounding situation is detected, appropriate information can be output to the driver, depending on the vehicle surrounding situation.

Figure 2:
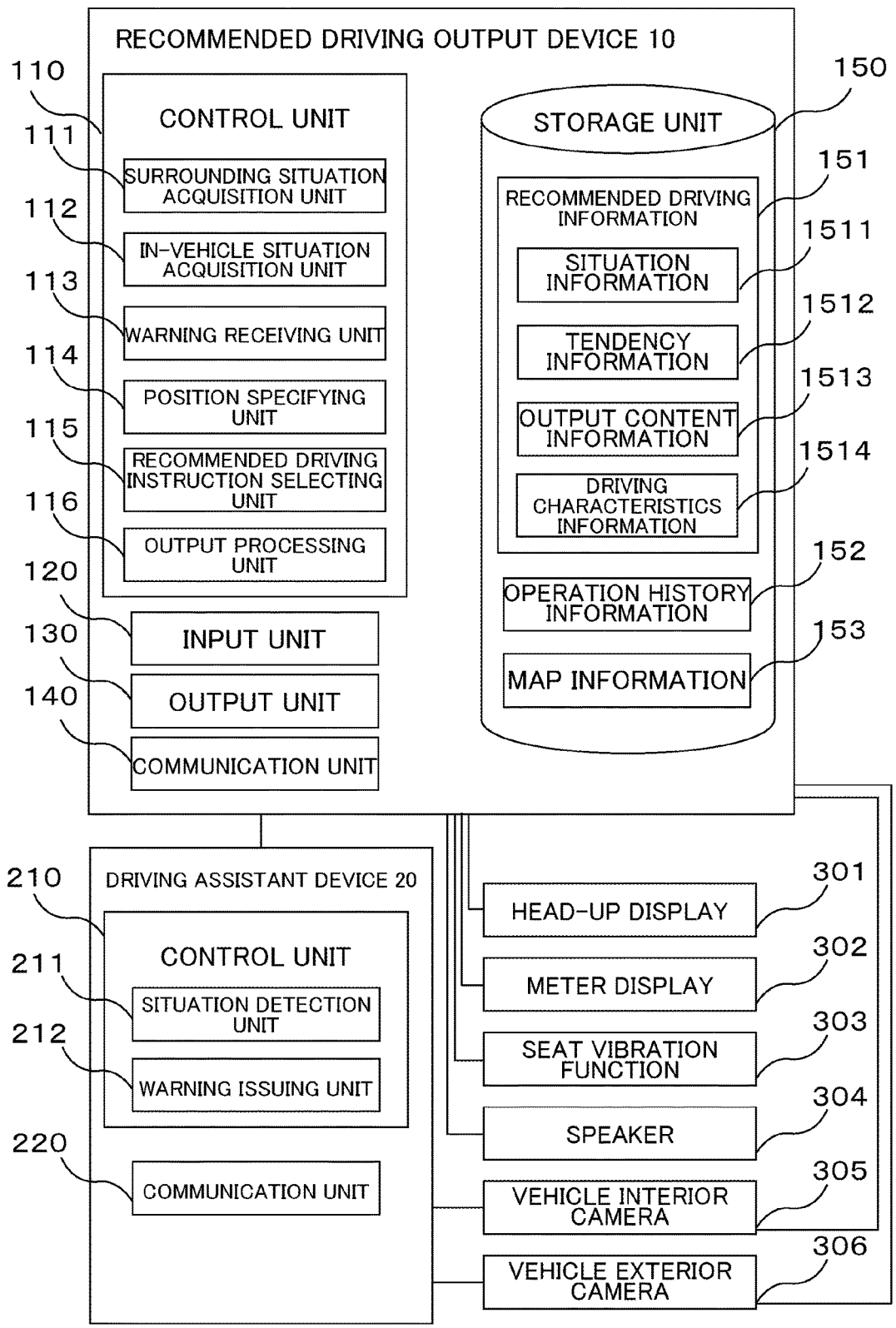
FIG. 2 is a diagram illustrating an example of a functional block configuration of the recommended driving output system.

FIG. 2 is a diagram illustrating an example of a functional block configuration of the recommended driving output system 1. The recommended driving output system 1 includes a recommended driving output device 10 and a driving assistant device 20. The recommended driving output device 10 is a device installed in a vehicle, and outputs information to a user. For example, the recommended driving output device 10 is an information processing device, such as a navigation device, an engine control unit (ECU), a personal computer (PC), and a smartphone. The recommended driving output device 10 and the driving assistant device 20 only need to be communicably connected to each other, and a communication method is not limited.

For example, the driving assistant device 20 is a device with a function of an advanced driving assistant system (ADAS) and a function of an automated driving control system. The driving assistant device 20 may be an information processing device, such as a personal computer (PC). The driving assistant device 20 monitors the surroundings of the vehicle A by using cameras or infrared sensors, for example. In this manner, the driving assistant device 20 detects an object present outside of the vehicle A, such as a vehicle traveling ahead of or around the vehicle A, and a pedestrian.

The recommended driving output device 10 is communicably connected to a head-up display 301, a meter display 302, a seat vibration function 303, a speaker 304, a vehicle interior camera 305, and a vehicle exterior camera 306. The head-up display 301 is a display disposed above an instrument panel that is located below a windshield in a vehicle. For example, the head-up display 301 may be a display that performs its function by projecting an image on a combiner that is provided near side from the windshield, or may be a display that performs its function by projecting an image directly on the windshield.

The meter display 302 is a display such as a liquid crystal display (LCD), which is mounted in an instrument panel. The seat vibration function 303 is embedded in a driver's seat, and vibrates a driver's seat by using a vibrator, for example. For example, the seat vibration function 303 includes a plurality of vibrators installed at various positions in a driver's seat. Each vibrator can be controlled independently of each other. With this configuration, each vibrator can be vibrated with a predetermined pattern, depending on information notified to the driver.

The speaker 304 is a device that outputs sound. Each of vehicle interior camera 305 and the vehicle exterior camera 306 is an image-capturing device using an image sensor such as a charge coupled device (CCD), and captures a still image or a video. The vehicle interior camera 305 captures an image of a situation inside a vehicle, while the vehicle exterior camera 306 captures an image of a situation outside a vehicle. Note that the vehicle exterior camera 306 only needs to be capable of acquiring the position of an object present outside of the vehicle A. Thus, instead of the vehicle exterior camera 306 or in addition to the vehicle exterior camera 306, the recommended driving output device 10 may be connected to a sensor, a radar, or light detection and ranging (LIDAR) that can specify a distance from an object present outside of a vehicle.

The vehicle interior camera 305 and the vehicle exterior camera 306 may also be communicably connected to the driving assistant device 20. Note that the vehicle interior camera 305 and the vehicle exterior camera 306 only need to be connected to at least one of the recommended driving output device 10 and the driving assistant device 20. The following description will be given using an example in which the vehicle interior camera 305 and the vehicle exterior camera 306 are connected to each of the recommended driving output device 10 and the driving assistant device 20.

The recommended driving output device 10 includes a control unit 110, an input unit 120, an output unit 130, a communication unit 140, and a storage unit 150. The control unit 110 generally controls the entire recommended driving output device 10. The input unit 120 acquires information that is input through an input device, such as a touch panel. The output unit 130 outputs information to output devices, such as the head-up display 301, the meter display 302, the seat vibration function 303, and the speaker 304. The communication unit 140 transmits and receives information to and from a device connected to the recommended driving output device 10, such as the driving assistant device 20. The storage unit 150 stores information necessary for processing of the control unit 110.

The control unit 110 includes a surrounding situation acquisition unit 111, an in-vehicle situation acquisition unit 112, a warning receiving unit 113, a position specifying unit 114, a recommended driving instruction selecting unit 115, and an output processing unit 116. The surrounding situation acquisition unit 111 acquires a vehicle surrounding situation. For example, the surrounding situation acquisition unit 111 acquires, as a vehicle surrounding situation, information about the position of an object present outside of a vehicle by using the vehicle exterior camera 306.

The surrounding situation acquisition unit 111 acquires a vehicle surrounding situation about the position of the vehicle A from the position specifying unit 114. For example, the vehicle surrounding situation about the position of the vehicle A is a situation in which the number of lanes is reduced in a traveling route of the vehicle A. Note that the surrounding situation acquisition unit 111 may acquire information about the position of an object present outside of a vehicle from the driving assistant device 20.

The in-vehicle situation acquisition unit 112 acquires information about the line of sight of the driver by using the vehicle interior camera 305. More specifically, the in-vehicle situation acquisition unit 112 acquires information about a direction of the line of sight of the driver. Note that the in-vehicle situation acquisition unit 112 may acquire information about the line of sight of the driver from the driving assistant device 20.

The warning receiving unit 113 receives warning information issued from the driving assistant device 20. For example, the warning receiving unit 113 receives warning information that is issued when a distance between the vehicle A and another vehicle present in front of the vehicle A is equal to or less than a predetermined distance.

The position specifying unit 114 specifies the position of the vehicle A. For example, the position specifying unit 114 specifies the position of the vehicle A on map information by using a function of the Global Positioning System (GPS) or the like, and finds information about a route (such as a lane) on which the vehicle A plans to travel. The position specifying unit 114 determines whether or not the number of lanes is to be reduced within a predetermined distance in a traveling route of the vehicle A.

The recommended driving instruction selecting unit 115 refers to the storage unit by using a warning received by the warning receiving unit 113 and a vehicle surrounding situation acquired by the surrounding situation acquisition unit 111 to select a relevant recommended driving instruction. Specifically, the recommended driving instruction selecting unit 115 determines whether or not a vehicle surrounding situation acquired by the surrounding situation acquisition unit 111 is included in recommended driving information (described later). When the recommended driving instruction selecting unit 115 determines that the vehicle surrounding situation is included in the recommended driving information, the recommended driving instruction selecting unit 115 identifies driving characteristics, which are associated with the vehicle surrounding situation in the recommended driving information, as first driving characteristics.

The recommended driving instruction selecting unit 115 refers to driving characteristics information (described later) by using a vehicle surrounding situation acquired by the surrounding situation acquisition unit 111, and identifies driving characteristics, which are associated with the vehicle surrounding situation, as second driving characteristics. When the first driving characteristics and the second driving characteristics correspond to each other, the recommended driving instruction selecting unit 115 selects the recommended driving instruction.

When the recommended driving instruction selecting unit 115 fails to select a recommended driving instruction, the recommended driving instruction selecting unit 115 selects a warning received by the warning receiving unit 113.

Note that the driving characteristics refer to a driver's operation tendency concerning the vehicle A when the driver is in a predetermined situation. Details thereof will be described later.

The output processing unit 116 generates output information for a recommended driving instruction selected by the recommended driving instruction selecting unit 115. For example, the output information is a display signal for a screen to be displayed on the head-up display 301 and the meter display 302. Further, for example, the output information is an output signal of sound to be output through the speaker 304. Further, for example, the output information is an output signal for vibrating the seat vibration function 303 with a predetermined pattern. The output processing unit 116 outputs the generated output information through the output unit 130 (described later).

The storage unit 150 stores recommended driving information 151, operation history information 152, and map information 153. The recommended driving information 151 is information in which a vehicle surrounding situation, a warning, and a recommended driving instruction are associated with each other. The operation history information 152 is information about a driver's operation history concerning the vehicle A. The map information 153 is information for illustrating a map. By comparing the map information 153 and information indicating the current position of the vehicle A with each other, a lane in which the vehicle A travels can be identified. By referring to the map information 153, whether or not the number of lanes is to be reduced in a route in which the vehicle A travels can be determined.

The recommended driving information 151 includes situation information 1511, tendency information 1512, output content information 1513, and driving characteristics information 1514. The situation information 1511 is information about a vehicle surrounding situation. The tendency information 1512 is information in which a vehicle surrounding situation is associated with driving characteristics with which a recommended driving instruction is to be output. The output content information 1513 is information in which a vehicle surrounding situation is associated with a recommended driving instruction to be output and situation description information indicating a reason of the recommended driving instruction. The driving characteristics information 1514 is information indicating driving characteristics of the driver of the vehicle A. The driving characteristics information 1514 is associated with driving characteristics depending on a vehicle surrounding situation, for each driver.

The driving assistant device 20 includes a control unit 210 and a communication unit 220. The control unit 210 generally controls the entire driving assistant device 20. The communication unit 220 transmits and receives information to and from another device that is connected to the driving assistant device 20.

The control unit 210 includes a situation detection unit 211 and a warning issuing unit 212. The situation detection unit 211 detects a vehicle surrounding situation of the vehicle A, by using the vehicle exterior camera 306 or a sensor (not illustrated). The warning issuing unit 212 determines whether or not the vehicle surrounding situation of the vehicle A is considered to be a warning cause. When the vehicle surrounding situation considered to be a warning cause is acquired, the warning issuing unit 212 transmits warning information to the recommended driving output device 10.

Note that, in a storage device (not illustrated) of the driving assistant device 20, vehicle surrounding situations considered to be a warning cause and warning reasons are stored in association with each other. With reference to such information, the warning issuing unit 212 can identify a warning reason associated with a vehicle surrounding situation detected by the situation detection unit 211. The warning issuing unit 212 issues warning information including a warning reason that is information such as "front collision detected" and "pedestrian detected." The warning information may include a vehicle surrounding situation that actually is a warning cause.

FIG. 3 is a diagram illustrating an example of a data structure of the situation information 1511. The situation information 1511 includes a type 1511a, a subject vehicle position 1511b, a situation of a nearby vehicle 1511c, a primary warning 1511d, a line of sight 1511e, a pedestrian 1511f, and reduction in the number of lanes 1511g.

The type 1511a is identification information for identifying a type of vehicle surrounding situation. The type 1511a is associated with record(s) of one or a plurality pieces of the situation information 1511. The subject vehicle position 1511b is information indicating the position of the vehicle A. For example, in columns, the subject vehicle position 1511b includes information for identifying a traveling lane, such as "left," "middle," and "right." "1" is stored in a column indicating a traveling lane of the vehicle A to which a recommended driving instruction is to be output.

The situation of a nearby vehicle 1511c is information indicating the position of a nearby vehicle. For example, in columns, the situation of a nearby vehicle 1511c includes information for identifying a traveling lane, such as "left_front," "middle_1 front," "middle_2 front," "right_front," "left_behind," "middle_behind," and "right_behind." Note that "middle_1 front" indicates that another vehicle is present at a position one vehicle ahead in the middle lane, and "middle_2 front" indicates that another vehicle is present at a position two vehicles ahead in the middle lane. In the situation of a nearby vehicle 1511c, "1" is stored in a column indicating a traveling lane of another vehicle, which is to be used as an output condition of a recommended driving instruction.

The primary warning 1511d is information indicating a warning reason of warning information. For example, in a column, the primary warning 1511d includes a plurality of warning reasons. "1" is stored in a warning reason to be used as an output condition of a recommended driving instruction.

The line of sight 1511e is information indicating a direction of the line of sight of the driver. For example, in columns, the line of sight 1511e includes information indicating a direction of the line of sight of the driver, such as "right," "left," and "down." "1" is stored in a column indicating the position of the line of sight to be used as an output condition of a recommended driving instruction.

The pedestrian 1511f is information indicating a position of a pedestrian present ahead of the vehicle A. For example, in columns, the pedestrian 1511f includes information indicating a lane in which a pedestrian is present, such as "left," "middle," and "right." "1" is stored in a column indicating a position of a pedestrian to be used as an output condition of a recommended driving instruction.

The reduction in the number of lanes 1511g is information indicating whether or not the number of lanes is to be reduced ahead of the vehicle A within a predetermined distance from the vehicle A. For example, when reduction in the number of lanes is used as an output condition of a recommended driving instruction, "1" is stored in the reduction in the number of lanes 1511g.

Note that it can be said that the subject vehicle position 1511b, the situation of a nearby vehicle 1511c, the primary warning 1511d, the line of sight 1511e, the pedestrian 1511f, and the reduction in the number of lanes 1511g included in one record constitute a vehicle surrounding situation to be used as an output condition of a recommended driving instruction.

FIG. 4 is a diagram illustrating an example of a data structure of the tendency information 1512. Records of the tendency information 1512 correspond to records of respective pieces of the situation information 1511. For example, the top record in the situation information 1511 illustrated in FIG. 3 corresponds to the top record in the tendency information 1512 illustrated in FIG. 4. The second record from the top in the situation information 1511 illustrated in FIG. 3 corresponds to the second record from the top in the tendency information 1512 illustrated in FIG. 4.

The tendency information 1512 includes a type 1512a and driving characteristics 1512b. The type 1512a is identification information for identifying a type of vehicle surrounding situation. The driving characteristics 1512b are information indicating driving characteristics of a general driver, which are to be used as an output condition of a recommended driving instruction. As ways to avoid a vehicle when a distance from a vehicle in front is reduced, in columns, the driving characteristics 1512b illustrated in FIG. 4 include information indicating driving characteristics, such as "move to left lane to avoid vehicle," "move to middle lane to avoid vehicle," "move to right lane to avoid vehicle," and "slow down." "1" is stored in driving characteristics to be used as an output condition of a recommended driving instruction.

Note that, when driving characteristics are not used as an output condition of a recommended driving instruction under a situation related to a corresponding vehicle surrounding situation, for example, information indicating "null" is stored in the tendency information 1512. For example, under a vehicle surrounding situation indicating that the position of the line of sight of the driver is "down," it is assumed that the driver has fallen asleep. In such a vehicle surrounding situation, when a recommended driving instruction is output irrespective of driving characteristics of the driver, information indicating "null" is stored in the driving characteristics 1512b that correspond to a vehicle surrounding situation indicating that the position of the line of sight is down.

FIG. 5 is a diagram illustrating an example of a data structure of the output content information 1513. Similarly to the tendency information 1512, records of the output content information 1513 correspond to records of respective pieces of the situation information 1511. The output content information 1513 includes a type 1513a, a predicted secondary warning 1513b, and a warning 1513c. The type 1513a is identification information for identifying a type of vehicle surrounding situation.

The predicted secondary warning 1513b is information indicating a warning reason of a secondary warning that is predicted to be issued when a vehicle surrounding situation related to a relevant record of the situation information 1511 is acquired.

The warning 1513c is information to be output when a relevant vehicle surrounding situation is acquired, and includes a notification 1513ca, a content 1513cb, and a recommended action 1513cc. The notification 1513ca is reference information related to a recommended driving instruction. The content 1513cb is information indicating a vehicle surrounding situation in a recommended driving output instruction, for example. For example, the content 1513cb is situation description information describing a vehicle surrounding situation and an instruction reason related to a recommended driving instruction.

The recommended action 1513cc is information indicating a recommended driving instruction. The notification 1513ca, the content 1513cb, and the recommended action 1513cc are, for example, identification information of character string or image information to be output to the head-up display 301 and the meter display 302, identification information for sound information to be output to the speaker 304, and/or identification information indicating a vibration pattern of the seat vibration function 303.

Note that the recommended action 1513cc illustrated in FIG. 5 is character string to be displayed on the head-up display 301. The content 1513cb in the drawing is character string to be displayed on the meter display 302. The notification 1513ca in the drawing is identification information for identifying a vibration pattern for vibrating the seat vibration function 303.

FIG. 6 is a diagram illustrating an example of a data structure of the driving characteristics information 1514. The storage unit 150 includes driving characteristics information 1514 for each driver of the vehicle A. Similarly to the tendency information 1512 and the output content information 1513, records of the driving characteristics information 1514 correspond to records of respective pieces of the situation information 1511.

The driving characteristics information 1514 includes a type 1514a and driving characteristics 1514b. The type 1514a is identification information for identifying a type of vehicle surrounding situation. The driving characteristics 1514b are information indicating driving characteristics of the driver. The driving characteristics 1514b indicate driving characteristics in a vehicle surrounding situation in a corresponding record of the situation information 1511.

For example, the top record in the driving characteristics information 1514 illustrated in FIG. 6 corresponds to the top record in the situation information 1511 illustrated in FIG. 3. In this record of the situation information 1511, the subject vehicle position 1511b indicates a "left" lane, the situation of a nearby vehicle 1511c indicates "left_front" (another vehicle is present ahead in the left lane) and "middle_behind" (another vehicle is present behind in the middle lane), and the line of sight 1511e indicates "right." Note that, in this vehicle surrounding situation, the primary warning 1511d indicating a possibility of a "front collision," is issued.

With reference to the top record of the driving characteristics information 1514, it can be found that the record includes the driving characteristics 1512b that the driver of the vehicle A "moves to the middle lane to avoid a vehicle" in this vehicle surrounding situation.

FIG. 7 is a diagram illustrating an example of a data structure of the operation history information 152. The operation history information 152 is information about a driver's operation history concerning the vehicle A. For example, the operation history information 152 is generated by the control unit 110 of the recommended driving output device 10 each time the driver performs a predetermined operation. The operation history information 152 is information generated for each driver operating the vehicle A.

The operation history information 152 includes a road situation (subject vehicle position) operation history 152a, a distance from a vehicle in front 152b, a distance required to change lanes 152c, operation when a distance from a vehicle in front was reduced 152d, operation when a distance from a vehicle behind was reduced 152e, and an average vehicle speed 152f. The road situation (subject vehicle position) operation history 152a is information indicating a situation when an operation history was acquired. For example, the road situation (subject vehicle position) operation history 152a is information indicating a type of position on a map in which the vehicle A traveled.

The distance from a vehicle in front 152b information indicating a distance between the vehicle A and a vehicle in front in a lane in which the vehicle A travels. Note that the distance from a vehicle in front 152b is information for acquiring an operation tendency concerning the vehicle A when a distance between vehicles is reduced, and only needs to be used as a reference of a distance between vehicles. For example, weighting is performed depending on whether a general road or a freeway, or on a traveling distance of the vehicle A, or the like, and a value calculated by the weighting used as a reference may be stored.

The distance required to change lanes 152c is information indicating a distance that was needed for the vehicle A to change lanes. The operation when a distance from a vehicle in front was reduced 152d is information indicating what sort of operation the vehicle A performed when a distance from a vehicle in front was reduced to a predetermined distance or less. For example, in the operation when a distance from a vehicle in front was reduced 152d, stored are information of "slow down," "avoid vehicle in front" as operation when there is a single lane on one side, and "move to right lane to avoid vehicle" and "move to left lane to avoid vehicle" as operation when there are a plurality of lanes.

The operation when a distance from a vehicle behind was reduced 152e is information indicating what sort of operation the vehicle A performed when a distance from a vehicle behind was reduced to a predetermined distance or less. The average vehicle speed 152f is an average value of a vehicle speed of the vehicle A.

Figure 8:
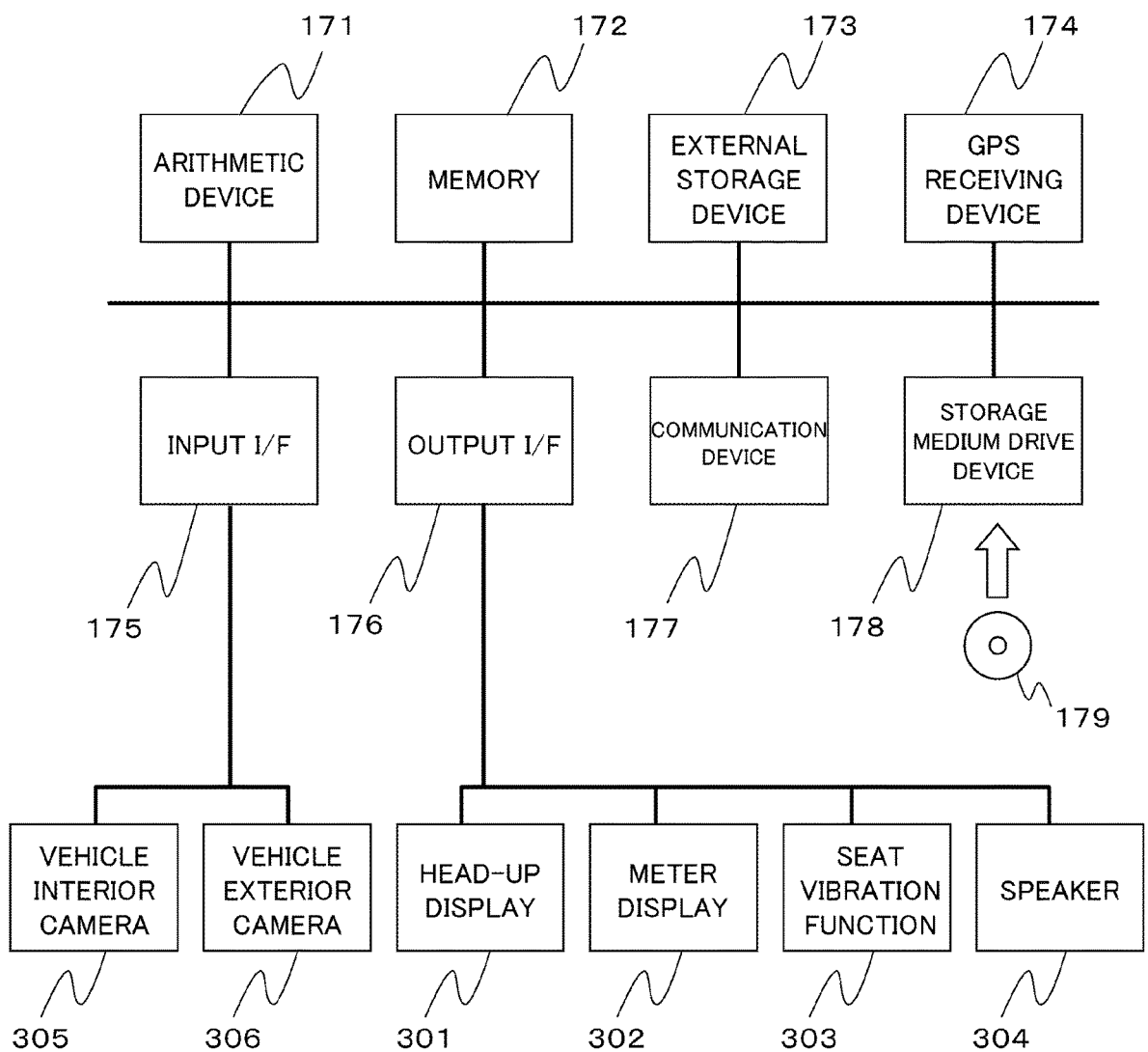
FIG. 8 is a diagram illustrating a hardware configuration example of a recommended driving output device.

FIG. 8 is a diagram illustrating a hardware configuration example of the recommended driving output device 10. The recommended driving output device 10 includes an arithmetic device 171, a memory 172, an external storage device 173, a GPS receiving device 174, an input interface (I/F) 175, an output I/F 176, a communication device 177, and a storage medium drive device 178. These components are connected to each other by a bus.

The arithmetic device 171 is a central arithmetic device, such as a central processing unit (CPU), and performs processing, according to a program recorded in the memory 172 or the external storage device 173. When the arithmetic device 171 executes the program, each processing unit constituting the control unit 110 implements its function.

The memory 172 is a storage device, such as random access memory (RAM) and flash memory, and functions as a storage area in which a program and data are temporarily read. For example, the external storage device 173 is a writable and readable storage medium, such as a hard disk drive (HDD).

The GPS receiving device 174 receives signals from GPS satellites, and measures, for three or more satellites, a distance between a movable body and each GPS satellite, and a change rate of each distance to obtain a present position, a traveling speed, and a traveling direction of the movable body. The function of the position specifying unit 114 is implemented with the GPS receiving device 174.

The input I/F 175 is an interface for connecting to an input device (not illustrated) that receives input operation from a user, such as a driver. For example, the input I/F 175 receives an input from a touch panel, a microphone, or the like. The input I/F 175 receives an input of information about a situation inside the vehicle, such as the line of sight of the driver, and information such as the position of an object present outside of the vehicle, from the vehicle interior camera 305 and the vehicle exterior camera 306.

The output I/F 176 is an interface for outputting information to an output device. Output devices, such as the head-up display 301, the meter display 302, the seat vibration function 303, and the speaker 304, are connected to the output I/F 176.

The communication device 177 is a device for connecting the recommended driving output device 10 to a vehicle network, and for example, a communication device in accordance with communication standards for Controller Area Network (CAN) or the like. Note that the recommended driving output device 10 and the driving assistant device 20 may be directly connected to each other via a connection interface, without using the vehicle network. The function of the communication unit 140 is implemented with the communication device 177. The storage medium drive device 178 is a device that inputs and outputs information to and from a portable medium, such as a compact disk (CD) and a digital versatile disk (DVD).

The function of the storage unit 150 is implemented with the memory 172 or the external storage device 173. The function of the storage unit 150 may be implemented with a storage device on a network.

Figure 9:
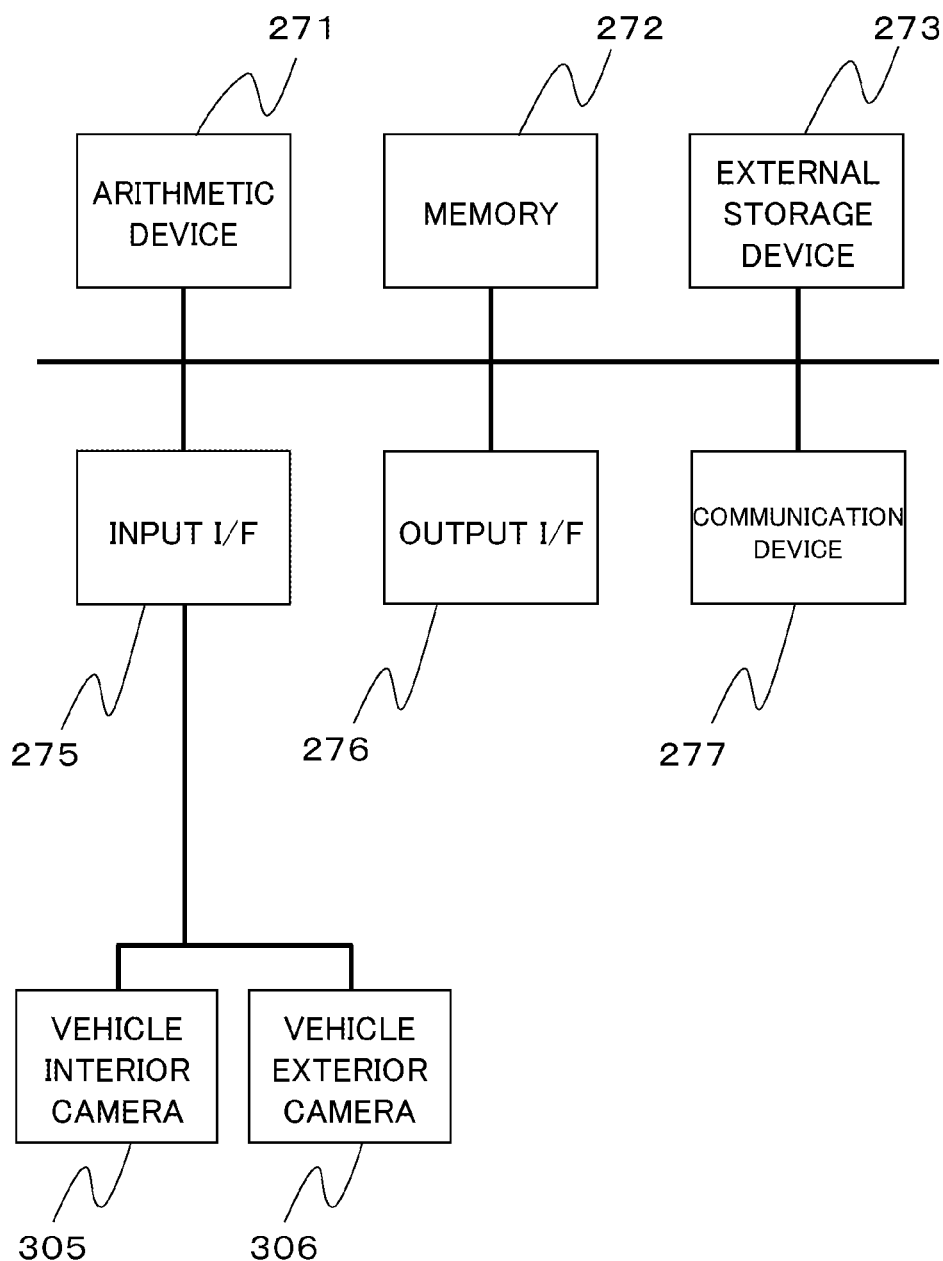
FIG. 9 is a diagram illustrating a hardware configuration example of a driving assistant device.

FIG. 9 is a diagram illustrating a hardware configuration example of the driving assistant device 20. The driving assistant device 20 includes an arithmetic device 271, a memory 272, an external storage device 273, an input I/F 275, an output I/F 276, and a communication device 277. These components are connected to each other by a bus.

The arithmetic device 271, the memory 272, the external storage device 273, the input I/F 275, the output I/F 276, and the communication device 277 are similar to the arithmetic device 171, the memory 172, the external storage device 173, the input I/F 175, the output I/F 176, and the communication device 177 of the driving assistant device 20. Thus, description of those components will be omitted. The output I/F 276 is an interface for outputting information to an output device included in the driving assistant device 20. The driving assistant device 20 may include a GPS receiving device and a storage medium drive device.

Note that processing of each of the components of the recommended driving output device 10 and the driving assistant device 20 may be performed by one piece of hardware, or may be performed by a plurality of pieces of hardware. Processing of each of the components of the recommended driving output device 10 and the driving assistant device 20 may be implemented by one program, or may be implemented by a plurality of programs.

Figure 10:
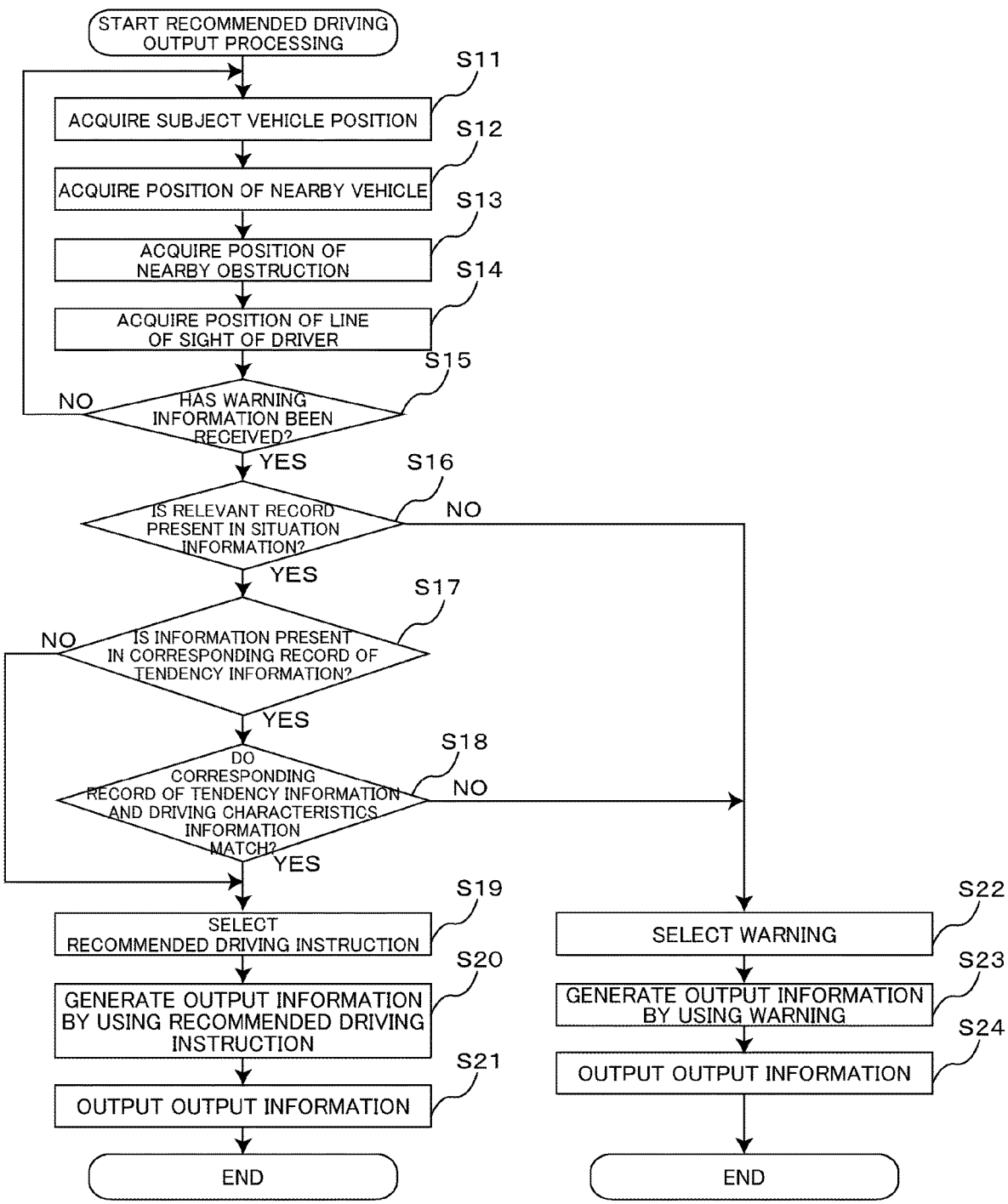
FIG. 10 is a flowchart illustrating an example of recommended driving output processing.

FIG. 10 is a flowchart illustrating an example of recommended driving output processing. For example, the processing of this flowchart is periodically started in the recommended driving output device 10. Note that, prior to the start of this processing, the control unit 110 of the recommended driving output device 10 generates the driving characteristics information 1514 by using the operation history information 152. For example, the control unit 110 sums up an operation history in the operation history information 152 for each record of a vehicle surrounding situation included in the situation information 1511. In this manner, the control unit 110 identifies driving characteristics of a driver under a situation related to the vehicle surrounding situation, and generates the driving characteristics information 1514.

First, the position specifying unit 114 acquires a subject vehicle position (Step S11). Specifically, the position specifying unit 114 determines whether or not the number of lanes is to be reduced in a lane in which the vehicle A travels and in a lane within a predetermined distance from the vehicle A, by using information acquired by the GPS receiving device 174.

Next, the surrounding situation acquisition unit 111 acquires a position of a nearby vehicle (Step S12). Specifically, the surrounding situation acquisition unit 111 acquires a relative position (distance, direction, etc.) of another vehicle present outside of the vehicle A with respect to the vehicle A, by using information acquired by the vehicle exterior camera 306.

Next, the surrounding situation acquisition unit 111 acquires a position of a nearby obstruction (Step S13). Specifically, the surrounding situation acquisition unit 111 acquires a relative position (distance, direction, etc.) of an object present outside of the vehicle A with respect to the vehicle A, by using information acquired by the vehicle exterior camera 306.

Next, the in-vehicle situation acquisition unit 112 acquires a direction of the line of sight of the driver (Step S14). Specifically, the surrounding situation acquisition unit 111 acquires a direction of the line of sight of the driver, by using information acquired by the vehicle interior camera 305. For example, the direction of the line of sight acquired by the surrounding situation acquisition unit 111 is information indicating "left," "right," "down," or the like.

Next, the warning receiving unit 113 determines whether or not warning information has been received from the driving assistant device 20 (Step S15). When the warning receiving unit 113 determines that warning information has not been received (in the case of "NO" in Step S15), the warning receiving unit 113 returns the processing to Step S11.

When the warning receiving unit 113 determines that warning information has been received (in the case of "YES" in Step S15), the recommended driving instruction selecting unit 115 determines whether or not a relevant record is present in the situation information 1511 (Step S16). Specifically, the recommended driving instruction selecting unit 115 refers to the situation information 1511 to determine whether or not the following record is present. Specifically, the record includes information indicating the position of the vehicle A acquired in Step S11 in the subject vehicle position 1511b and the reduction in the number of lanes 1511g, information indicating the position of a nearby vehicle acquired in Step S12 in the situation of a nearby vehicle 1511c, information indicating the position of a nearby object acquired in Step S13 in the pedestrian 1511f, and information indicating the position of the line of sight of the driver acquired in Step S14 in the line of sight 1511e.

Note that the information indicating the position of a nearby object acquired in Step S13 may be other than a pedestrian. In such a case, the situation information 1511 includes a column corresponding to the acquired vehicle surrounding situation. The recommended driving instruction selecting unit 115 refers to the column corresponding to the vehicle surrounding situation acquired in Step S13, and thereby determines whether or not a relevant record is present.

When a record of the situation information 1511 including these pieces of information is present, the recommended driving instruction selecting unit 115 identifies the primary warning 1511d included in the record. When a warning reason included in the warning information that is determined to have been received in Step S15 corresponds to the identified primary warning 1511d, the recommended driving instruction selecting unit 115 determines that the record including the vehicle surrounding situation is Present in the situation information 1511. When the recommended driving instruction selecting unit 115 determines that a relevant record is present in the situation information 1511, the recommended driving instruction selecting unit 115 identifies the record.

Note that, in a stage prior to Step S15, when a vehicle surrounding situation detected by the situation detection unit 211 of the driving assistant device 20 is a warning cause, the warning issuing unit 212 of the driving assistant device 20 issues warning information to the recommended driving output device 10. When the recommended driving output device 10 receives the warning information in Step S15 and it is determined that a relevant record is present in the situation information 1511 in Step S16, a vehicle surrounding situation included in the relevant record includes the vehicle surrounding situation considered to be a warning cause.

When the recommended driving instruction selecting unit 115 determines that a relevant record is not present in the situation information 1511 (in the case of "NO" in Step S16), the recommended driving instruction selecting unit 115 advances the processing to Step S22.

When the recommended driving instruction selecting unit 115 determines that a relevant record is present in the situation information 1511 (in the case of "YES" in Step S16), the recommended driving instruction selecting unit 115 determines whether or not information is present in a corresponding record of the tendency information 1512 (Step S17). Specifically, the recommended driving instruction selecting unit 115 refers to the tendency information 1512 to determine whether or not information other than "null" is included in the driving characteristics 1512b of a record of the tendency information 1512 corresponding to the record identified in Step S15. When information of "null" is stored in the driving characteristics 1512b of the record, the recommended driving instruction selecting unit 115 determines that information of a corresponding record of the tendency information 1512 is not present.

When the recommended driving instruction selecting unit 115 determines that information is not present in a corresponding record of the tendency information 1512 (in the case of "NO" in Step S17), the recommended driving instruction selecting unit 115 advances the processing to Step S19.

When the recommended driving instruction selecting unit 115 determines that information is present in a corresponding record of the tendency information 1512 (in the case of "YES" in Step S17), the recommended driving instruction selecting unit 115 determines whether or not the corresponding record of the tendency information 1512 and the driving characteristics information 1514 match (Step S18). Specifically, the recommended driving instruction selecting unit 115 identifies a record of the tendency information 1512 corresponding to the record identified in Step S15. The recommended driving instruction selecting unit 115 identifies the driving characteristics 1512b included in the record as first driving characteristics to be used as an output condition of a recommended driving instruction.

The recommended driving instruction selecting unit 115 refers to the driving characteristics information 1514 by using the vehicle surrounding situation acquired in Step S11 to Step S14 to determine that the driving characteristics 1514b corresponding to the vehicle surrounding situation are driving characteristics of the driver during driving under the vehicle surrounding situation, and identifies the driving characteristics 1514b as second driving characteristics. The recommended driving instruction selecting unit 115 determines whether or not the first driving characteristics and the second driving characteristics match.

When the recommended driving instruction selecting unit 115 determines that the corresponding record of the tendency information 1512 and the driving characteristics information 1514 do not match (in the case of "NO" in Step S18), the driver is considered not to have driving characteristics to be used as an output condition of a recommended driving instruction, and the recommended driving instruction selecting unit 115 advances the processing to Step S22.

When the recommended driving instruction selecting unit 115 determines that the corresponding record of the tendency information 1512 and the driving characteristics information 1514 match (in the case of "YES" in Step S18), or when it is determined that information is not present in a corresponding record of the tendency information 1512 in Step S17 (in the case of "NO" in Step S17), the recommended driving instruction selecting unit 115 selects a recommended driving instruction (Step S19). Specifically, the recommended driving instruction selecting unit 115 identifies a record of the output content information 1513 corresponding to the record of the situation information 1511 identified in Step S16. The recommended driving instruction selecting unit 115 selects a recommended driving instruction included in the recommended action 1513cc of the record.

Next, the output processing unit 116 generates output information by using the recommended driving instruction (Step S20). Specifically, the output processing unit 116 generates output information including the recommended driving instruction selected in Step S19. The output processing unit 116 generates output information including situation description information that is included in the content 1513*cb* of the record. The output information including the recommended driving instruction and the output information including the situation description information are output to different output devices.

For example, the output processing unit 116 generates output information for displaying the recommended driving instruction included in the recommended action 1513*cc* on the head-up display 301. Alternatively, for example, the output processing unit 116 generates a signal for vibrating the seat vibration function 303 as output information, by using a vibration pattern included in the recommended action 1513*cc*. For example, when a recommended driving instruction that prompts deceleration is output, the output processing unit 116 vibrates the seat vibration function 303 in such a manner that vibration shifts from a front side to a rear side on a seat. Further, for example, when a recommended driving instruction that prompts a change of a lane to the right lane is output, the output processing unit 116 vibrates the seat vibration function 303 in such a manner that a right side of a surface of a seat is vibrated.

Further, for example, the output processing unit 116 generates output information for displaying the situation description information included in the content 1513*cb* on the meter display 302. Further, for example, when the recommended action 1513*cc* included in the identified record is not information indicating a vibration pattern, the output processing unit 116 generates a signal for vibrating the seat vibration function 303 as output information, by using a vibration pattern of the notification 1513*ca*. Which output device is used to output the information included in the warning 1513*c* of the output content information 1513 is stored in an area (not illustrated) of the storage unit 150 in advance.

Next, the output unit 130 outputs the output information (Step S21). After that, the control unit 110 terminates the processing of this flowchart.

Figure 11A:
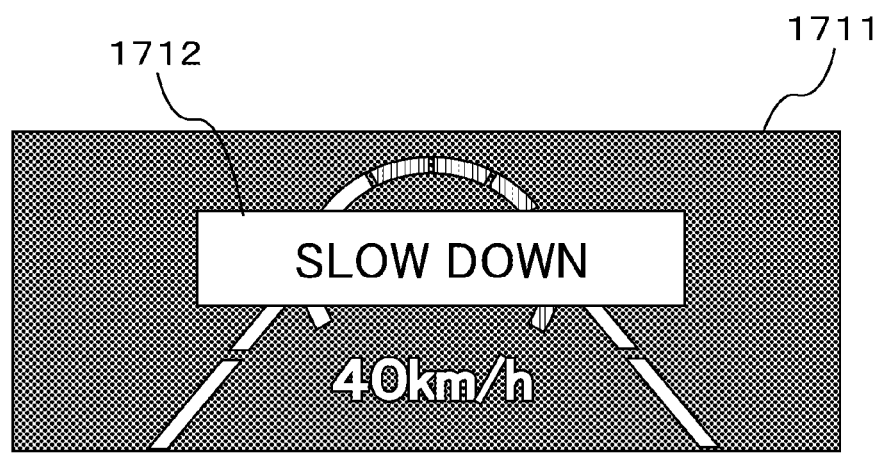
FIGS. 11A and 11B are diagrams illustrating examples of display screens of a head-up display and a meter display, respectively.
Figure 11B:
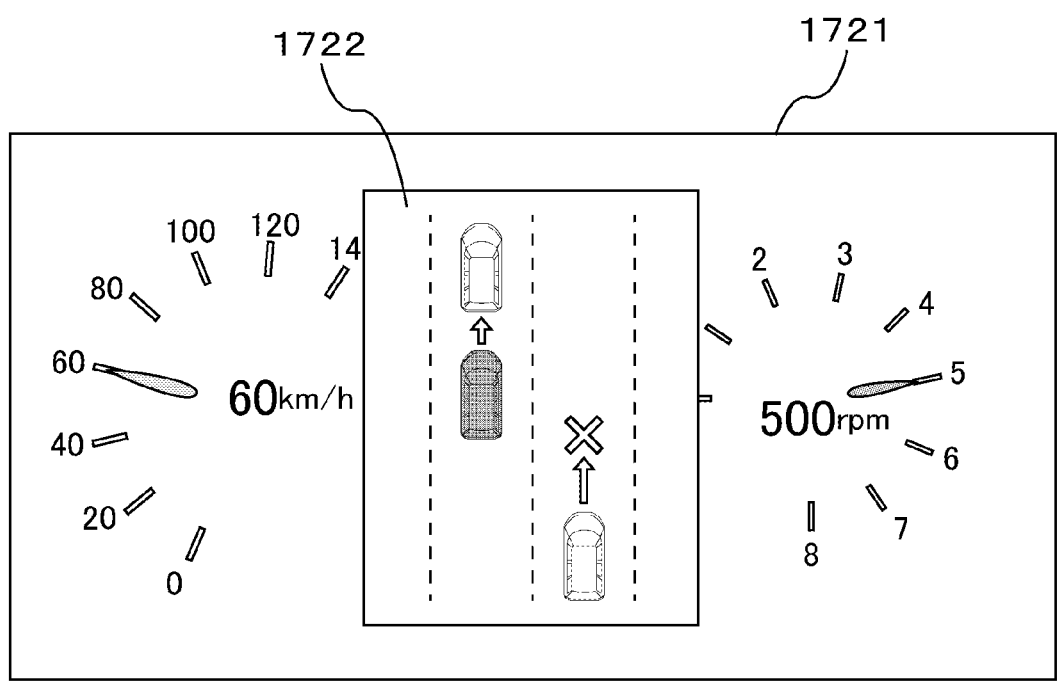

FIGS. 11A and 11B are diagrams illustrating examples of display screens of the head-up display 301 and the meter display 302, respectively. FIG. 11A illustrates an example of a display screen 1711 of the head-up display when a vehicle surrounding situation included in the top record of the situation information 1511 illustrated in FIG. 3 is acquired, and the driver of the vehicle A has driving characteristics related to the top record of the tendency information 1512 corresponding to the top record of the situation information 1511. In FIG. 5, the recommended action 1513*cc* of the top record of the output content information 1513 corresponding to the top record of the situation information 1511 is "slow down."

The top record of the situation information 1511 corresponds to the vehicle surrounding situation illustrated in FIG. 1A. Specifically, when the vehicle A travels in the left lane, another vehicle travels in front of the vehicle A within a predetermined distance from the vehicle A, yet another vehicle approaches the vehicle A from behind the vehicle A in the middle lane, the line of sight of the driver is directed to the right, and the driver has a tendency to move to the middle lane to avoid a vehicle under this vehicle surrounding situation, a recommended driving instruction that prompts deceleration is displayed on the head-up display 301, as illustrated in FIG. 11A.

The display screen 1711 of the head-up display includes a recommended driving instruction display area 1712. The output processing unit 116 considers the character string "slow down" as a recommended driving instruction. The output processing unit 116 generates output information for displaying the recommended driving instruction in the recommended driving instruction display area 1712, and displays the recommended driving instruction on the display screen 1711 of the head-up display.

FIG. 11B is a diagram illustrating an example of a display screen 1721 of the meter display. The display screen 1721 of the meter display includes a situation description information display area 1722. In the situation description information display area 1722, information indicating situation description information is displayed. The situation description information may be character string. Alternatively, as illustrated in FIG. 11B, the situation description information may be a schematic image of a vehicle surrounding situation, or a video in which an actual vehicle surrounding situation is recorded. The situation description information may be information related to the direction of the line of sight of the driver.

When a recommended driving instruction is displayed on the head-up display 301, the driver can easily recognize a recommended driving instruction depending on a situation. When a situation that caused output of the recommended driving instruction is displayed on the meter display 302, information related to a situation when the recommended driving instruction is output can be appropriately provided to the driver, depending on movement of the line of sight of the driver.

Referring back to FIG. 10, further description is given. When it is determined that a relevant record is not present in the situation information 1511 in Step S16 (in the case of "NO" in Step S16), or when it is determined that the corresponding record of the tendency information 1512 and the driving characteristics information 1514 do not match in Step S18 (in the case of "NO" in Step S18), the recommended driving instruction selecting unit 115 selects a warning (Step S22). In other words, when it is determined that a relevant record is not present in the situation information 1511 in Step S16, or when it is determined that the corresponding record of the tendency information 1512 and the driving characteristics information 1514 do not match in Step S18, it is considered that selection of a recommended driving instruction failed, and thus the recommended driving instruction selecting unit 115 selects a warning.

Specifically, in an area (not illustrated) of the storage unit 150 of the recommended driving output device 10, notification information is associated with each warning reason of warning information that is to be output from the driving assistant device 20. The recommended driving instruction selecting unit 115 refers to the area (not illustrated) of the storage unit 150 by using the vehicle surrounding situation acquired in Step S11 to Step S14, and selects notification information of a primary warning associated with the vehicle surrounding situation in the area.

Next, the output processing unit 116 generates output information by using the selected warning (Step S23). Specifically, the output processing unit 116 generates information for outputting the notification information of the warning.

Next, the output unit 130 outputs the output information (Step S24). Specifically, the output unit 130 causes an output device, such as the head-up display 301, to output the output information of the primary warning generated in Step S23. After that, the control unit 110 terminates the processing of this flowchart.

Note that the warning information acquired in Step S15 of this processing includes a warning reason. In Step S16, the recommended driving instruction selecting unit 115 determines whether or not a relevant record is present in the situation information 1511, by using the vehicle surrounding situation acquired in Step S11 to Step S14. However, the warning information acquired in Step S15 may include a vehicle surrounding situation considered to be a warning cause.

In such a case, in Step S15, the surrounding situation acquisition unit 111 of the recommended driving output device 10 acquires the vehicle surrounding situation included in the warning information as a vehicle surrounding situation considered to be a warning cause. After that, in Step S16, the recommended driving instruction selecting unit 115 refers to the situation information 1511 by using the vehicle surrounding situation considered to be a warning cause and the vehicle surrounding situation acquired in Step S11 to Step S14 to determine whether or not a record of the situation information 1511 including the vehicle surrounding situation is present.

In such a case, in Step S18, the recommended driving instruction selecting unit 115 may refer to the driving characteristics information 1514 by using the vehicle surrounding situation considered to be a warning cause acquired in Step S15 to identify driving characteristics of the driver under the vehicle surrounding situation considered to be a warning cause as second driving characteristics.

Note that the vehicle surrounding situation and the recommended driving instruction described above are merely an example. An appropriate recommended driving instruction is output, depending on various vehicle surrounding situations.

For example, as illustrated in FIG. 1B, when a distance between the vehicle A and another vehicle in front of the vehicle A is reduced to a predetermined distance or less in a lane in which the vehicle A travels, warning information is output. In this case, it is assumed that yet another vehicle is present behind the vehicle A, and driving characteristics of the driver when a distance from the vehicle in front is reduced present a tendency to slow down. When the driver decelerates according to the driving characteristics, there may be a collision with the vehicle approaching from behind. To prevent this, the recommended driving instruction selecting unit 115 selects a recommended driving instruction that prompts movement to another lane, as in the recommended action 1513cc corresponding to "02" of the type 1513a of the output content information 1513 illustrated in FIG. 5.

Further, for example, description is given of a case where another vehicle approaches the vehicle A from behind the vehicle A in a lane (for example, the left lane) in which the vehicle A travels, yet another vehicle travels behind in an adjacent lane (for example, the middle lane) that is next to the lane in which the vehicle A travels, and the driver has driving characteristics of moving to the adjacent lane. When the lane is changed according to the driving characteristics in order to avoid the vehicle traveling behind in the lane the same as the lane of the vehicle A, there may be a collision with the vehicle traveling in the adjacent lane. To prevent this, the recommended driving instruction selecting unit 115 selects a recommended driving instruction that prompts acceleration.

According to the present embodiment, when a predetermined vehicle surrounding situation is detected, a recommended driving instruction can be appropriately output depending on the vehicle surrounding situation. Further, according to driving characteristics of a driver, a recommended driving instruction to be output can be more flexibly selected.

Additionally, when the vehicle surrounding situation of case (2) occurs subsequently to the vehicle surrounding situation of case (1) in the situation illustrated in FIG. 1A, conventionally, a warning is output each time the vehicle surrounding situation of case (1) and the vehicle surrounding situation of case (2) are detected. In the present embodiment, the recommended driving output device 10 outputs a recommended driving instruction depending on the vehicle surrounding situation of case (1) and the vehicle surrounding situation of case (2). In this manner, an event that may occur after the occurrence of the vehicle surrounding situation of case (2) can be avoided. Specifically, a warning regarding the occurrence of the vehicle surrounding situation of case (2) is not issued.

In the above, each of the embodiments and modifications according to the present invention is described. The present invention is not limited to the examples of the embodiments described above, and encompasses various modifications. For example, the examples of the embodiments described above are described in detail for the sake of better understanding of the present invention, and the present invention is not limited to including all the configurations described herein. A part of a configuration of one example of one embodiment can be replaced with a configuration of another example. A configuration of another example can be added to a configuration of one example of one embodiment. Another configuration can be added to, deleted from, and replaced with a part of a configuration of one example of each embodiment. A part or all of each configuration, function, processing unit, processing means, and the like, described above may be designed in an integrated circuit to be implemented as hardware, for example. Control lines and information lines illustrated in the drawings are those considered necessary for the sake of description, and do not represent all control lines and information lines. It may be considered that almost all of the configurations are connected to each other.

The functional configurations of the recommended driving output device 10 and the driving assistant device 20 described above are classified according to main details of their processing, for the sake of easier understanding. How the components are classified and referred to do not limit the invention of the present application. The configurations of the recommended driving output device 10 and the driving assistant device 20 can be further classified to have more components, according to the details of their processing. The components can be classified so that one component performs more processing.

REFERENCE SIGNS LIST

1: Recommended driving output system
10: Recommended driving output device
20: Driving assistant device
110, 210: Control unit
111: Surrounding situation acquisition unit
112: In-vehicle situation acquisition unit
113: Warning receiving unit
114: Position specifying unit
115: Recommended driving instruction selecting unit
116: Output processing unit
120: Input unit
130: Output unit
140, 220: Communication unit
150: Storage unit
151: Recommended driving information
152: Operation history information 153: Map information
171, 271: Arithmetic device
172, 272: Memory
173, 273: External storage device
174: GPS receiving device
175, 275: Input I/F
176, 276: Output I/F
177, 277: Communication device
178: Storage medium drive device
211: Situation detection unit
212: Warning issuing unit
301: Head-up display
302: Meter display
303: Seat vibration function
304: Speaker
305: Vehicle interior camera
306: Vehicle exterior camera
1511: Situation information
1512: Tendency information
1513: Output content information
1514: Driving characteristics information
1711: Display screen of head-up display
1712; Recommended driving instruction display area
1721: Display screen of meter display
1722: Situation description information display area

What is claimed is:

1. A recommended driving output device comprising:
a surrounding situation acquisition unit configured to acquire a surrounding situation of a vehicle;
a recommended driving information storage unit configured to store the surrounding situation of the vehicle, a warning, and a recommended driving instruction in association with each other;
a warning receiving unit configured to receive a warning depending on the surrounding situation of the vehicle;
a recommended driving instruction selecting unit configured to select the recommended driving instruction from the recommended driving information storage unit, by using the warning received by the warning receiving unit and the surrounding situation of the vehicle acquired by the surrounding situation acquisition unit, compares a first driving characteristic of a first driver not driving the vehicle with a second driving characteristic of a second driver driving the vehicle during the surrounding situation of the vehicle, wherein the first driver and the second driver are different drivers; and
an output processing unit configured to output the recommended driving instruction selected by the recommended driving instruction selecting unit upon a comparison of the first and second driving characteristics matching.

2. The recommended driving output device according to claim 1, wherein
when the recommended driving instruction selecting unit fails to select the recommended driving instruction, the recommended driving instruction selecting unit selects the warning, and
the output processing unit outputs the warning.

3. The recommended driving output device according to claim 1, further comprising
an in-vehicle situation acquisition unit configured to acquire a direction of a line of sight of a driver driving the vehicle, wherein
the recommended driving information storage unit includes information related to the direction of the line of sight of the driver driving the vehicle, and
when the warning receiving unit receives the warning, the recommended driving instruction selecting unit selects the recommended driving instruction, by using the direction of the line of sight acquired by the in-vehicle situation acquisition unit.

4. The recommended driving output device according to claim 1, wherein
the output processing unit outputs information related to the surrounding situation of the vehicle or information related to a direction of a line of sight of a driver driving the vehicle, as well as outputting the recommended driving instruction.

5. The recommended driving output device according to claim 1, wherein
the recommended driving information storage unit stores a vibration pattern according to the recommended driving instruction, and
the output processing unit vibrates a driver's seat by using the vibration pattern.

6. A recommended driving output method implemented by a recommended driving output device,
the recommended driving output device including a recommended driving information storage unit, a surrounding situation acquisition unit, a warning receiving unit, a recommended driving instruction selecting unit, and an output processing unit,
the recommended driving information storage unit storing a surrounding situation of a vehicle, a warning, and a recommended driving instruction in association with each other,
the recommended driving output method comprising that:
the surrounding situation acquisition unit executes a surrounding situation acquisition procedure of acquiring the surrounding situation of the vehicle,
the warning receiving unit executes a warning receiving procedure of receiving a warning depending on the surrounding situation of the vehicle,
the recommended driving instruction selecting unit executes a recommended driving instruction selecting procedure of selecting the recommended driving instruction from the recommended driving information storage unit, by using the warning received by the warning receiving unit and the surrounding situation of the vehicle acquired by the surrounding situation acquisition unit, and comparing a first driving characteristic of a first driver not driving the vehicle with a second driving characteristic of a second driver driving the vehicle during the surrounding situation of the vehicle, wherein the first driver and the second driver are different drivers, and
the output processing unit executes an output procedure of outputting the recommended driving instruction selected by the recommended driving instruction selecting unit upon a comparison of the first and second driving characteristics matching.

7. A recommended driving output system comprising a recommended driving output device and a driving assistant device, wherein
the driving assistant device includes:
a situation detection unit configured to detect a surrounding situation of a vehicle; and
a warning issuing unit configured to issue a warning depending on the surrounding situation of the vehicle detected by the situation detection unit,
the recommended driving output device includes:
a surrounding situation acquisition unit configured to acquire the surrounding situation of the vehicle;

a recommended driving information storage unit configured to store the surrounding situation of the vehicle, a warning, and a recommended driving instruction in association with each other;

a warning receiving unit configured to receive the warning depending on the surrounding situation of the vehicle;

a recommended driving instruction selecting unit configured to select the recommended driving instruction from the recommended driving information storage unit, by using the warning received by the warning receiving unit and the surrounding situation of the vehicle acquired by the surrounding situation acquisition unit, compare a first driving characteristic of a first driver not driving the vehicle with a second driving characteristic of a second driver driving the vehicle during the surrounding situation of the vehicle, wherein the first driver and the second driver are different drivers; and an output processing unit configured to output the recommended driving instruction selected by the recommended driving instruction selecting unit upon a comparison of the first and second driving characteristics matching, and when the warning receiving unit receives the warning from the warning issuing unit, the output processing unit outputs the recommended driving instruction selected by the recommended driving instruction selecting unit, by using the warning.

* * * * *